US009648664B2

(12) United States Patent
Dietz et al.

(10) Patent No.: US 9,648,664 B2
(45) Date of Patent: May 9, 2017

(54) COMMUNICATION TERMINAL

(71) Applicant: VODAFONE HOLDING GMBH, Duesseldorf (DE)

(72) Inventors: Ulrich Dietz, Munich (DE); Ben Borsetzky, Munich (DE)

(73) Assignee: VODAFONE GMBH, Duesseldorf (DE)

( * ) Notice: Subject to any disclaimer, the term of this patent is extended or adjusted under 35 U.S.C. 154(b) by 645 days.

(21) Appl. No.: 13/662,613

(22) Filed: Oct. 29, 2012

(65) Prior Publication Data

US 2013/0165110 A1 Jun. 27, 2013

(30) Foreign Application Priority Data

Oct. 28, 2011 (EP) ..................................... 11187079

(51) Int. Cl.
*H04W 88/06* (2009.01)
*H04W 4/22* (2009.01)
*H04W 48/18* (2009.01)
*H04W 68/12* (2009.01)
*H04W 76/00* (2009.01)

(52) U.S. Cl.
CPC .............. *H04W 88/06* (2013.01); *H04W 4/22* (2013.01); *H04W 48/18* (2013.01); *H04W 68/12* (2013.01); *H04W 76/007* (2013.01)

(58) Field of Classification Search
CPC . H04W 76/002; H04W 76/007; H04W 88/06; H04W 4/22; H04W 48/18; H04W 68/12
USPC ............................................... 455/404.1, 434
See application file for complete search history.

(56) References Cited

U.S. PATENT DOCUMENTS

| 5,974,328 | A | 10/1999 | Lee et al. | |
| 7,113,764 | B1 * | 9/2006 | Jang et al. | 455/404.1 |
| 2002/0147024 | A1 * | 10/2002 | Wan | 455/515 |

(Continued)

FOREIGN PATENT DOCUMENTS

WO 2009124131 A2 10/2009

OTHER PUBLICATIONS

ETSI TR 122 967 V7.0.0 Technical Report "Digital cellular telecommunications system (Phase 2+); Universal Mobile Telecommunications System (UMTS); Transferring of emergency call data," European Telecommunications Standards Institute (2006).

Primary Examiner — Joseph Dean, Jr.
(74) Attorney, Agent, or Firm — Kriegsman & Kriegsman

(57) ABSTRACT

A communication terminal, in particular an eCall terminal. The terminal comprises a communication unit and an interface for communication of the terminal with communication networks. The terminal comprises a determination unit for determining in which communication network the terminal is located. The terminal comprises a database in which communication network related data for a number of different communication networks are stored and in which said communication network related data are linked to paging channels of the respective communications networks. The terminal further comprises a scanning unit for scanning paging channels and an evaluation unit for evaluating information received via a paging channel. In addition the present invention relates to a method of scanning paging channel and to a method for activation of a communication terminal.

14 Claims, 1 Drawing Sheet

(56) References Cited

U.S. PATENT DOCUMENTS

| | | | |
|---|---|---|---|
| 2003/0224840 A1* | 12/2003 | Frank | G01C 21/26 455/575.9 |
| 2006/0189331 A1* | 8/2006 | Lundsjo et al. | 455/458 |
| 2007/0004454 A1* | 1/2007 | Schweiger et al. | 455/558 |
| 2008/0102784 A1* | 5/2008 | Mittal | H04M 11/04 455/404.1 |
| 2009/0156201 A1 | 6/2009 | Pudney et al. | |
| 2009/0253403 A1* | 10/2009 | Edge | H04W 76/007 455/404.2 |
| 2011/0039553 A1* | 2/2011 | Willey | 455/426.1 |

\* cited by examiner

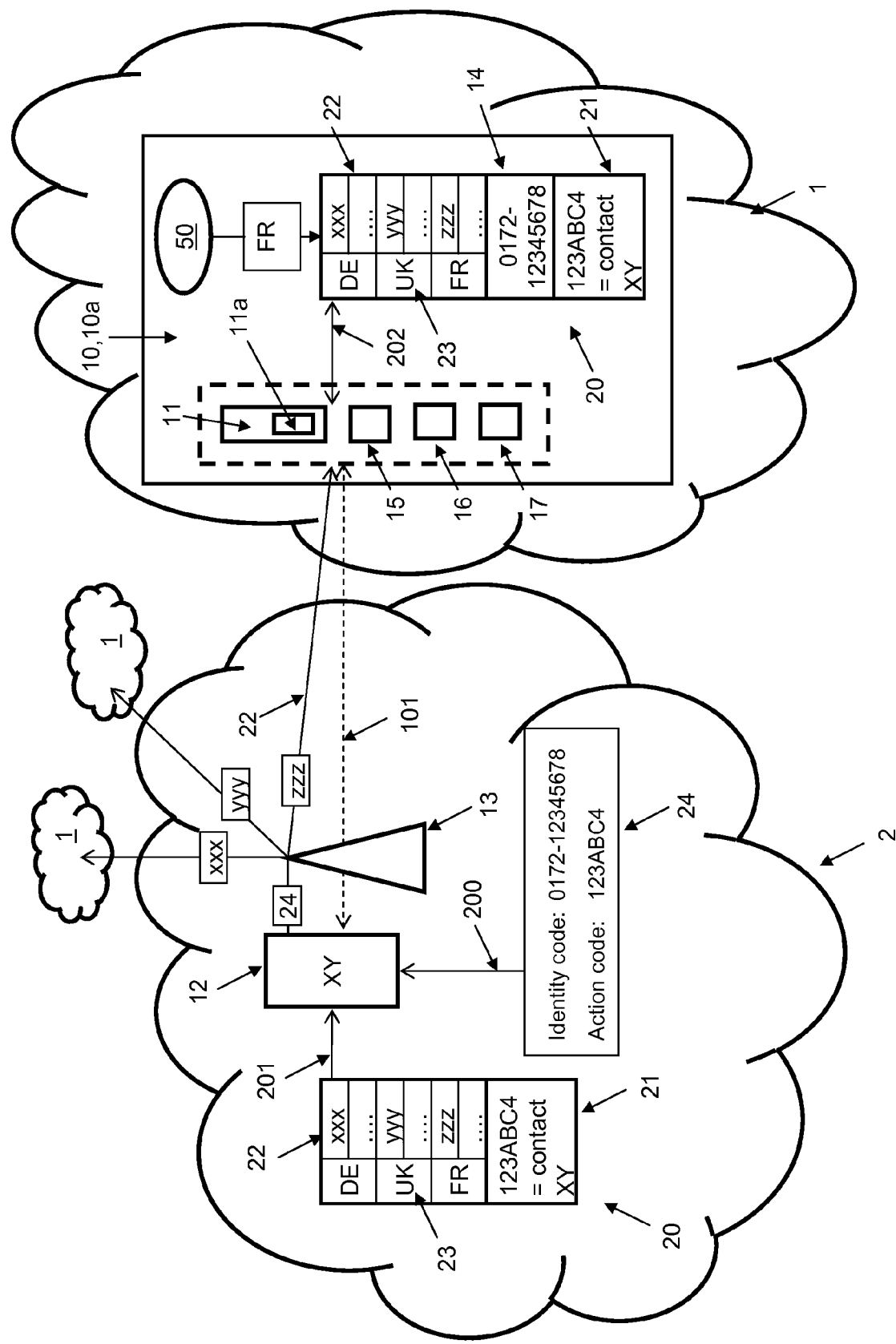

COMMUNICATION TERMINAL

The present invention relates to a communication terminal. Furthermore the present invention relates to a method of scanning paging channels and to a method for activation of a communication terminal.

Paging is a commonly known technique either used as an enabler and necessary element in the organisation of network functions, for example idle mobile stations are alerted using a paging mechanism or, secondly, as a service available as a paging service—a kind of one way messaging services that are offered in a variety of plans and options to meet the needs of a subscriber and the type of device used. This kind of paging or a paging process is usually performed by calling a pager whereas the former is a general mechanism not directly available to the user.

In a mobile communication network, be it a mobile cellular voice and data network or a dedicated paging network, a device or pager that has been attached to the system may be idle, inactive or parked, as it is not in use. As no communication channel exists, a paging request is used to transfer initial data and to initialise the communication.

In pager networks pagers are given unique identifier or phone numbers; alphanumeric pagers are given an email address, sometimes consisting of a phone number. When for example a third party like a person wants to contact the pager, the third party dials the pagers' number. This process is a kind of activation request. Simplified said, the third party for example sends a message to the pager and wants the owner of the pager to contact the third party.

In GSM networks the paging process is usually performed by broadcasting information on dedicated paging channels that the device scans in predefined intervals or via broadcast channels, like the Forward Access Channel or the Broadcast Channels. Receiving parties may include the general public or a relatively large subset of thereof including a single phone and in essence a single person.

The main advantage of the paging process is that it is possible to have millions of devices in idle mode without consuming 'sacred' shared bandwidth while at the same time to be able to get in contact with every cell phone or pager that is in idle mode and whose location is unknown. As mentioned above, if a third party sends a message to the pager, the third party often wants the owner of the pager, whose location is unknown to the calling third party, to contact the third party. This call back is not possible in dedicated pager networks as they are one way services. A pager can only receive data and is not able to send data. This kind of communication is called simplex communication.

Simplex communication is a communication that occurs in one direction only. The pager can just listen and receive information, but is not able to send information, because pagers usually do not comprise a sending unit.

One technique by which the location of a device is also unknown but which is able to send data or information or messages is called eCall, short for Emergency Call.

'eCall' is a pan European project which intends to bring rapid assistance to motorists involved in a collision anywhere in the European Union. The project intends a communication terminal to be installed in all new vehicles. This communication terminal comprises for example a communication module, in particular equipped with a Subscriber Identity Module (SIM), which is adapted to react to vehicle sensor information, such as airbag deployment and impact sensor information and the like, and send the position coordinates of the vehicle and other crash relevant information to local emergency agencies, for example the Public Safety Answering Points (PSAPs).

eCall is an initiative by the European Commission. Such a 'public' eCall will be mandatory in every new car from 2014 or 2015 on.

The 'Article 29 Data Protection Working Party' as an independent European advisory body to the European Commission on data protection and privacy commented the European Commissions eCall initiative in September 2006 in the 'Working document on data protection and privacy implications in eCall initiative'.

For a public eCall, it is required that, despite of the socio-economic benefits, data protection and privacy must be guaranteed. Therefore two requirements have been defined and must be fulfilled. Firstly, eCall users must not be traceable, which is sufficiently guaranteed by the so called 'Sleeping SIM' concept adopted. This is realised by the device only performing an emergency attach in case or an accident. Secondly, eCall users must be able to switch off the system completely at their discretion so that the eCall device will under no circumstances—even in case of an accident—attach to any network.

As mentioned above, an eCall device comprises a sending unit, like a modem for sending information to a third party and a SIM for the necessary identification when performing an emergency attach to the network. Due to data protection and privacy reasons it is not possible for a third party to directly call an eCall device in Sleeping SIM mode or to send information to an eCall device as it is usually not attached to the network.

In the document WO 2009/124131 A2 it is described how an eCall device by use of a Sleeping SIM is used. The eCall device is not attached to the communication network and therefore, the communication network is not able to determine the whereabouts, track or contact the eCall device. By doing so, the method described in WO 2009/124131 A2 fulfils the requirements for eCall required by the Article 29 Data Protection Working Party.

Only in case of an emergency, when an eCall has to be performed, the eCall device registers with one of the available communication networks by performing an emergency attach. A suitable network has prior been identified by scanning the available BCCHs broadcasted by every cellular network. The BCCH provides necessary information required for registering to a communication network, and is derived from that open broadcast channel available with every communication network. Via such broadcast channels the operator of a communication network transmits general network information such as name, frequencies, timing information and the like. Such information are required by a communication terminal, before the terminal starts a registration procedure.

In normal use a communication device registers to a network by providing a set of authentication information derived or stored on the SIM in an kind of handshake process. From that moment on, the device is registered to the network and is part of that network, even if it is dormant or idle for some time. For the regular operation of a cellular network the network pages that handset in regular intervals and the handset or the network perform updates on certain events like a reasonable change of position like a Location Area change or other. With that the device regularly reveals its position which is not acceptable for an eCall device.

A registration in the communication network by the eCall device shall only be performed in case of an emergency. When an eCall device is registered with the communication network and an eCall is performed, several data in form of the Minimum Set of Data (MSD), which will be described in the following description of the present invention, will be transmitted from the eCall device via the communication network to the PSAP. Due to the registration with the network provider, the location and identity of the eCall device is deliberately and intentionally revealed. This is, on one hand, a necessary prerequisite for a successful communication and when the location and other parameters are known, a communication to the eCall device can be established and information can be sent from and to the eCall device.

Unfortunately the communication to the PSAP can only be established after the eCall device has registered with the communication network in a way, that the provider of communication network knows the address for contacting the eCall device. This is on one hand necessary for the call back into the vehicle and on the other hand a technical prerequisite. Would the eCall device have been registered earlier or would it move afterwards, the MNO would additionally be able to page the device regularly and be able to determine a moving pattern.

For contacting a regular eCall device from the network operator's side, for example in situations no emergency has occurred, there is no way possible, because the data protection and privacy requirements have to be fulfilled. In such a situation, where the network operator wants to contact the eCall device, the solution presented in WO 2009/124131 A2 is not applicable.

It is the object of the present invention to provide a communication terminal, in particular an eCall terminal, as well as a method of scanning paging channels and a method of activating a communication terminal, by use of which the network operator is enabled to contact the communication terminal and for which the requirements concerning data protection and privacy of Article 29 Data Protection Working Party are fulfilled nevertheless.

In accordance with the present invention, this object is solved by a communication terminal, in particular an eCall terminal, said terminal comprising a communication unit and an interface for communication of said terminal with communication networks, said terminal comprising a determination unit for determining in which communication network the terminal is located, characterised in that the terminal comprises a database in which communication network related data for a number of different communication networks are stored, in which said communication network related data are linked to paging channels of the respective communications networks, that the terminal comprises a scanning unit for scanning paging channels and that the terminal further comprises an evaluation unit for evaluating information received via a paging channel.

This object is also solved by a method of scanning paging channels of communication networks by use of a communication terminal, in particular a communication terminal as described above, characterised by the following steps:
  the terminal determines in which communication network the terminal is located,
  the terminal selects a paging channel related to said communication network in which the terminal is located from a database, said database comprising communication network related data for a number of different communication networks, said communication network related data being linked to paging channels of the respective communications networks, and
  the terminal scans the selected paging channel for information.

This object is also solved by a method of activating a communication terminal, in particular a communication terminal, in particular an eCall terminal, said terminal comprising a communication unit and an interface for communication of said terminal with communication networks, said terminal comprising a determination unit for determining in which communication network the terminal is located, characterised in that the terminal comprises a database in which communication network related data for a number of different communication networks are stored, in which said communication network related data are linked to paging channels of the respective communications networks, that the terminal comprises a scanning unit for scanning paging channels and that the terminal further comprises an evaluation unit for evaluating information received via a paging channel, in which the terminal is registered in a home communication network, for establishing a communication with a communication network in which the terminal is located, characterised in that the home communication network sends information to other communication networks and through other communication networks via paging channels linked to said home communication network, that the terminal scans those paging channels by use of a method as described above, and that the terminal establishes a communication to the communication network in which it is located.

Additional features and details of the present invention become apparent from the dependent claims, from the description and from the drawing. Features and details described in connection with the communication terminal according to the first aspect of the invention are, of course, also valid in connection with the method of scanning paging channels according to the second aspect of the invention and the method of activating a communication terminal according to the third aspect of the invention, and vice versa. Features and details described in connection with the method of scanning paging channels according to the second aspect of the invention are, of course, also valid in connection with the method of activating a communication terminal according to the third aspect of the invention, and vice versa. Thus, in respect of the disclosure of one of the aspects of the present invention, full reference is always made reciprocally to the disclosure of each other aspect of the present invention.

In particular, the communication terminal keeps dormant all the time until being woken up by a well defined external event.

Pursuant to a first aspect of the present invention the object is solved by a communication terminal. The terminal comprises a communication unit and an interface for communication of the terminal with communication networks. The terminal comprises a determination unit for determining in which communication network the terminal is located. The terminal is characterised in that the terminal comprises a database in which communication network related data for a number of different communication networks are stored. In the database the communication network related data are linked to paging channels of the respective communications networks. The terminal further comprises a scanning unit for scanning paging channels and an evaluation unit for evaluating information received via an paging channel.

In the first aspect of the invention a communication terminal is presented. A communication terminal is a terminal used to communicate in a communication network.

Communication is the activity of conveying information. Communication requires usually a sender, a message, and an intended recipient, although the receiver need not be present or aware of the sender's intent to communicate at the time of communication; thus communication can occur across vast distances in time and space. The communication process is in particular complete once the receiver has understood the sender's or originator's message.

The present invention is not limited to specific kinds of communication networks. A communication network can be a telecommunications network for example. A communication network is usually a collection of terminals, links and nodes which interconnect to enable communication, in particular telecommunication between users of the terminals. Each terminal in the network must have a unique address or identifier so that messages or connections can be routed to the correct recipients. In particular, the communication network can be a mobile telecommunication network.

A communication terminal for the communication within a communication network can be any type of suitable terminal. In a preferred embodiment, a communication terminal can be for example an eCall terminal. The eCall terminal can be embedded in the vehicle or as a nomadic version brought into the vehicle by a user. Such a nomadic communication terminal can be a mobile telephone, a smart phone, a computer, a mobile computer, a notebook, a laptop, a netbook, a tablet PC, a personal digital assistant, a navigation device or the like. The present invention is not limited to specific types of communication terminals.

In the following the term communication terminal is called "terminal" to simplify the description of the present invention. By this simplification it should be clear that the term terminal only replaces the term communication terminal. In addition the term terminal can be replaced by the term "device" or "unit" or "system". In the present invention, the terms "terminal", "device" and "unit" and "system" can be used in the same context, so that all these terms have the same meaning.

In the following the term communication network is called "network" too, to simplify the description of the present invention.

The terminal can be an eCall terminal. As mentioned above, eCall is a project initiated by the European Commission and intended to bring rapid assistance to motorists involved in a collision anywhere in the European Union.

An eCall terminal is a terminal or unit or system or device which can be used for performing an eCall. The term eCall is an abbreviation of Emergency Call. During or after an eCall, which is addressed to a public agency called the Public Safety Answering Point (PSAP), crash relevant information is transmitted. Often, a Minimum Set of Data (MSD) is transmitted as information from the eCall terminal to the PSAP.

A Minimum Set of Data (MSD) is a known term in the field of communications and rescue services, especially a known term in the field of eCalls. A Minimum Set of Data particularly comprises data which supplement an eCall and are helpful background data for rescue services. For example a Minimum Set of Data can comprise an identification number, in particular a Vehicle Identification Number (VIN), the location and the direction of the eCall terminal to ensure fast and quick help in an emergency case. A Minimum Set of Data can also comprise sensor information, in case of vehicle sensor information such as airbag deployment and impact sensor information and the like. The Minimum Set of Data is usually assembled and packaged during the eCall procedure, that means after an eCall is triggered.

Further on, an eCall flag set signals to the network and the PSAP if the eCall was triggered manually or automatically.

The terminal comprises a communication unit and an interface for communication of said terminal with communication networks.

The term "comprise" is not used in a limiting way in the present invention. It is understood in a way that the terminal can have—in addition to the communication unit and the interface—additional components.

A communication unit is a unit, which can also be called system or device or the like by which the terminal can perform a communication. A communication unit can for example comprise a Subscriber Identity Module (SIM). The SIM can be used for the necessary identification and addressability in a communication system.

To be able to perform a communication, the terminal comprises an interface. An interface is particularly understood as a tool and concept that refers to a point of interaction between components. An interface allows a component to function independently to communicate with other components via an input/output system.

The terminal can communicate—by use of such an interface—with communication networks which are generally described above already.

The terminal comprises a determination unit for determining in which communication network the terminal is located. For example the terminal can detect its location by use of the determination unit. How this can be done is described in the following and so full reference is made to this description. The present invention is not limited to specific types of determination units. A determination unit can be for example a global positioning system (GPS), which is a commonly known term.

By use it the determination unit the terminal can determine its location. As synonym for the term "location", the terms "position", "place" or "point" can be used. The present invention is not limited to the term "location".

As already mentioned above, the terminal determines its location. This can be performed by consideration of the communications networks.

For example, in Europe several different communication networks are available and/or active. Using the determination unit, the terminal can determine in which communication network it is located and can derive network name, country and other information. How this can be performed will be described in more detail further below so full reference is made to this following section.

One key feature of the present invention is a special database.

The terminal comprises such a database in which communication network related data for a number of different communication networks are stored. Preferably, the database is stored or implemented inside the terminal, on a SIM, SIM.Card, SIM-application for example. A database is generally spoken an organized collection of data for one or more purposes, usually in digital form. The data are typically organized to model relevant aspects of reality, in a way that supports processes requiring this information. It is also possible that the terminal comprises an interface to a database. In such case the database is not part of the terminal. The database is located somewhere else and the terminal has access to the database.

In the database of the present invention several data elements or information are stored. Furthermore these data elements or information are connected in a specific way. In the database communication network related data are stored. This can be explained by use of the above mentioned example. In Europe several different communications networks are available and/or active. These communication networks are specified for example by their identifications, their network names or their frequency which are used for exchanging information. The communication network related data are data which specify or explain or define the communication networks, in particular in more detail. This can be done in any way, so that the present invention is not limited to specific types of communication network related data.

In the database a number of communication network related data are stored. The communication related data are characteristic for the communication network, to which they belong. Therefore, a number of different communication network related data of a number of different communication networks are stored in said database. The term "number" is understood in this context, that "multiple" or a "variety" or a "plurality" of communication network related data are stored in the database. In particular, the number of communication network related data or sets of data is/are equal for the number of communication networks supported. As mentioned above, every network has an identity, like a name and/or an identity and/or a specific frequency. The communication network related data can make up these identities of the communications network(s).

This can be explained by use of the above mentioned example. The terminal can for example determine a communication network "A" for Germany and a communication network "B" for France. The identity of the communication network "A" can be the letter "A"; the identity of the communication network "B" can be the letter "B". The communication network related data which are stored in the database could be for example the identities "A" and "B" for the communication networks in Germany and France.

In the database the communication network related data are linked to paging channels of the respective communication networks. Such different communication networks can be part of a communication network family. For example the communication networks can be part of a family of mobile communication networks, which can be operated in different countries. Therefore, paging channels of different communication networks are stored in said database. In particular, address data or data identifying such paging channels are stored in said database. Preferably such information about a paging channel are stored in said database that allow the terminal to listen to said paging channels.

In particular, a "paging channel" is a channel linked to a communication network. A paging channel can be an internal channel of a communication network. For example, the paging channel can be a control channel, a broadcast channel or the like. A paging channel particularly serves to transmit an enquiry to a terminal. A terminal can listen to a paging channel to find out if or when an enquiry is transmitted to its address.

In particular, a paging channel is a channel in a communication network which can be listened by a number of participants. However, in particular, the paging channel must be known to the participants and they particularly must have a kind of access to the channel. A paging channel can be for example a broadcast channel. The present invention is not limited to specific types of paging channels. An paging channel can also be an activation channel or an addressing channel or the like. Preferably, the channel can be listened or received by a plurality of communication members. It is also possible that the paging channel is a secret channel and only a few parties know the keys or identifiers for listening in or receiving the channel. When the paging channel is a secret channel the channel is in particular coded. This means that the channel cannot be accessed by every device or person. In addition to listening or receiving it is also possible that information or data can be sent via an paging channel.

The term "linked" is understood in a way, that a connection or a relation or an association or a relationship exists between the communication network related data and the respective paging channels. This can also be explained by the above mentioned example.

As already mentioned above, the terminal determined for example the communication network "A" in Germany and the communication network "B" in France. When the communication network "A" comprises a paging channel, this channel can be called "Channel A". For the communication network "B" the paging channel can be called "Channel B". In the database the communication network related data "A" are linked to "Channel A", and the communication network related data "B" are linked to "Channel B". By this, a relationship between the determined and/or available communication networks related data and the respective paging channel is established. In particular at least one single paging channel is available for each communication network.

This link or relationship can be performed in several ways. For example the link can be performed or done by the terminal, while the terminal determines the communication networks or the communication network related data. Doing so, the terminal can for example also determine the paging channel for the respective communication network related data. In particular the link between communication network related data and the paging channel is stored within the database, for example during the initialisation of the terminal. This can be done for example by the provider of a communication network.

When the paging channels are permanently valid, the link between the communication network related data and the paging channels must not be updated. If the link changes, the database has to be updated. This can be performed upon request or during maintenance in a garage or in any other way. Necessary strategies how to achieve long time stable relationships can be developed easily. If the terminal is not able to listen into an paging channel due to potentially outdated data, the terminal may signal this to the user, but under no circumstances, in order to fulfil the Article 29 working party requirements, attach to the network to update the database.

The list of the communication related data and the paging channels can be copied to the communication terminal during an initial registration of the communication terminal in the communication network, for example.

The terminal further comprises a scanning unit for scanning paging channels. Relating to the invention, a scanning unit is a unit by use of which the terminal can scan or look for something. The term "scan" can also be replaced by term like "look for" or "listen" or "tap" or "snoop". The scanning unit scans in particular paging channels. Information or data can be sent by use of these paging channels. In such case, the scanning unit scans for information or data which are sent or transmitted via these paging channels.

The terminal also comprises an evaluation unit for evaluating information received via a paging channel.

As mentioned above, the scanning unit scans the paging channel for information. When information or data are transmitted via a paging channel, the information or data is received by the terminal and finally evaluated. How this evaluation can be performed will be described in detail further below, so that full reference is made to this passage.

As already mentioned above, the terminal can receive information. The present invention is not limited to specific types of information. The terminal can also receive "data" or "signals" or "messages" or the like. In this context, the term "information" is understood in a way, that the terminal receives something.

According to one preferred embodiment of the present invention, the determination unit is adapted for performing tapping broadcast channels and/or measuring of the signal strength of a communication network and/or that the determination unit comprises a position detection unit. Therefore the determination unit is adapted for tap into broadcast channels.

As already mentioned above, the term "tap" can be used as a synonym for "listen" or "scan" or the like. The present invention is not limited to this term.

The determination unit is adapted to tap into broadcast channels for example. The term "adapt" is understood in a way, that the determination unit can be "used for" or can be "utilized for" or is "configured for allowing" tapping broadcast channels.

A broadcast channel can be an open channel. Sending information via a broadcast channel is often called broadcasting. Broadcasting itself can be understood as addressing many recipients like radio or TV does. Broadcasting is a wireless or wire line distribution of predominantly audio or video content to a dispersed audience via for example broadcast radio, television or any other kind of medium.

When tapping the broadcast channel the determination unit can receive information or data concerning the identity and other generally available information of the communication network.

According to a different embodiment, the determination unit can be adapted for measuring the signal strength of a communication network. The signal strength is different at different positions for and within each communication network. When the terminal is located at a border between two communication networks, the determination unit can receive information about both communication networks, for example.

The determination unit can also comprise a position detection unit. A position detection unit is often called position detection system. Examples for position detection units are the global positioning system (GPS) or the Galileo system.

According to another preferred embodiment, the communication network related data stored in the database are data related to communication networks of the same communication network type. For example, the communication networks can be mobile communication networks in different countries.

As mentioned already above, the database contains or includes communication network related data. These data can comprise the names and supplementary information of communication networks for example. In the above mentioned example, the communication network related data are the names "A" and "B" of communication networks in Germany and France.

In the example, the communication network A in Germany and the communication network B in France are for example telecommunications networks of the same type. This means, that the communication networks whose related data are stored in the database are equal or comparable. Equal or comparable communication networks are available, if for example the communication networks are telecommunication networks or the like.

According to another preferred embodiment, the evaluation unit is adapted to evaluate the received information in relation to information stored in the terminal.

The terminal can receive information by scanning and/or subsequently tapping the paging channels.

When the terminal receives information via the paging channel, this information has to be evaluated. This can be done for example by an "evaluation" or a "verification" or an "analysis" or a "comparison" or a "check" or the like.

Therefore, information is stored in the terminal. This information can be for example the identity of the terminal. When the terminal receives information via a paging channel, this information can be compared to/with the information stored in the terminal, which can be the identity of the terminal for example. This identity information is not limited to the identity information stored on the SIM but can also comprise other information like hardware related terminal information.

By this evaluation the terminal detects if the information received by the terminal corresponds or fits to the information which is stored in the terminal. Because the present invention is not limited to the term information, the terminal can also receive data or messages which will then be evaluated with data or messages stored in the terminal.

As mentioned above, the evaluation is a kind of comparison. The terminal checks, if the received information matches with information stored in the terminal and/or with the results of a computation. The terminal compares the received information to/with information stored in the terminal. The information stored in the terminal can be stored in the database, when the database is implemented within the terminal. Information expected and to be matched can be a result of a computation.

According to another preferred embodiment, the information received by the terminal via an paging channel comprises an identity code and/or an action code. An identity code can be called an identity or identifier. For example, the identity code of a terminal can be transmitted via the paging channel. An identity code can for example be the number of the communication terminal. An action code can be a code concerning an action which should be performed by the terminal after the information is evaluated by the terminal. Examples for identity codes and/or action codes are given in the following description. This corresponds to the general scheme of having to have the addressees address to be able to send a payload, like letter, email or data to him.

According to another preferred embodiment, the information stored in the terminal comprises an identity code and/or an action code.

As mentioned already above the received information can comprise an identity code and/or an action code. For the evaluation of the information which should be done in relation to information stored in the terminal, the information stored in the terminal should also comprise an identity code and/or an action code.

When for example the information received by the terminal comprises an identity code, and the identity is stored in form of an identity code in the terminal, the terminal can compare if the information received by the terminal is or was addressed to the terminal. If the result of the evaluation is that the information was not addressed to the terminal, the terminal does not need to further evaluate or consider the received information and may delete or ignore it. The whole process follows a clear request response scheme.

If the result of the evaluation is, that the received information was addressed to the terminal, the terminal can also evaluate the received action code. The result of an evaluation of the action code could be that the terminal contacts the communication network provider or a third party or the like. The contacting process can be performed depending on the information transmitted.

The evaluation of the received information is suitable or required because the paging channels can alternatively be broadcast channels which can be listened in by a variety of users. Thus, information can be received by a variety of terminals for example. By the evaluation of the received information it can be ensured or guaranteed that the information, including for example an action code, reaches the intended addressee.

In order to assure the information is received, the initialisation request and activation code can be repeatedly unicasted or broadcasted until the receiver correctly attaches to the network and so delivers the acknowledge message. By attaching to the network and fulfilling the required action, the network is aware of the successful initialisation or paging.

According to another preferred embodiment, the terminal comprises an activation unit for activation of the terminal in the communication network for establishing a communication with the network in which the terminal is located.

As mentioned above, it is possible that the terminal has to perform an action after the received information is evaluated. Such action can be for example an activation of the terminal in the communication network for establishing a communication with the network in which the terminal is located.

This activation is, in particular, done in the communication network in which the terminal is located.

The term activation is understood in a way, that the terminal actively performs an action. The present invention is not limited to specific types of actions. An action can be for example that the terminal registers or logs in at the communication network in which it is located. The required information therefore can be stored in the terminal or the terminal can have an interface to an external database where the required information for registration or login is stored.

According to another preferred embodiment, the activation unit is adapted for performing an activation of the terminal in the communication network based on the results of the evaluation.

As already mentioned above, the terminal can perform an activation of the terminal in the communication network, like for example remote deactivation of a vehicle or switching between two tariffs on a smartmeter. In particular, this can be done based on the results of the evaluation. Other actions are also possible.

If a terminal receives information, the evaluation can be performed according to the received identity, for example. If the received identity code and the stored identity code are compared, and the received identity code matches the stored identity code, the terminal can be activated in the communication network for establishing a communication with the network in which the terminal is located.

In addition, the activation of the terminal can be performed after the evaluation of the received action code in relation to the stored action code. The result of the information evaluation can for example be that the terminal is immediately activated. It is also possible, that the terminal is activated at a specific time and/or after a specific waiting time or a duration period.

Depending on the activation code, not only different actions can be performed but also different, for example predefined or on the fly generated addresses can be called or addressed.

Preferably the communication terminal comprises means for performing the following methods according to the second and third aspect of the present invention. Therefore, full reference is made to the disclosure relating to those methods according to the present invention.

According to a second aspect of the invention, a method of scanning paging channels of communication networks by use of a communication terminal is disclosed. The method can be performed by use of a communication terminal according to the first aspect of the invention as mentioned above. The method is characterised by the steps, that the terminal determines in which communication network the terminal is located, the terminal selects a paging channel related to said communication network, in which the terminal is located, from a database, said database comprising communication network related data for a number of different communication networks, said network related data being linked to paging channels of the respective communication networks, and the terminal scans the selected paging channel for information.

In particular the method of scanning paging channels of communication networks uses a communication terminal according to the first aspect of the present invention.

Because the same terms are used with respect to the second aspect which are already described in the description of the first aspect, full reference is made to the disclosure relating to these terms.

By use of the method according to the second aspect of the invention, paging channels of communication networks are scanned by use of a communication terminal.

The description of a paging channel, a communication network and a communication terminal can be found in the corresponding description above related to the first aspect of the present invention. Full reference is made to these sections.

The paging channels are scanned for information related to the communication network. So, a paging channel is a part of a communication network.

For performing the method according to the second aspect of the invention, the terminal determines in which communication network the terminal is located. As already mentioned above, this is possible by use of a position detection unit. The terminal can comprise a position detection unit or the terminal can comprise an interface to a position detection unit. The location determination can be performed in a way as described already above referring to the first aspect of the invention. So, full reference is also made to the description.

As already described in the first aspect of the present invention, the determination in which communication network the terminal is located can also be performed by tapping broadcast channels and/or measuring the signal strength of a communication network. The present invention is not limited to specific types of method for determining in which communication network the terminal is located.

After the terminal has determined the communication network, the terminal selects a paging channel related to the communication network in which the terminal is located from a database.

The database can be located in the terminal. Alternatively the terminal can comprise an interface to a database. The database can be stored in an external device.

The paging channel is a specific communication channel. In particular one paging channel is assigned to a communication network. How this can be realised is already described in detail with regard to the first aspect of the present invention. Full reference is made to the corresponding description.

If, for example information or data are transmitted via a paging channel, a number of participants, like communication channels can receive the transmitted information or data.

The database comprises communication network related data for a number of different communication networks. This aspect is also described in detail in regard to the first aspect of the present invention. Full reference is also made with regard to the first aspect of the present invention.

The communication network related data can for example be the identity or name of the communication network. The present invention is not limited to specific types of communication network related data.

In particular, the communication network data are linked to the paging channels of the respective communication networks. Simplified said, in the database a paging channel, which can be for example a broadcast channel, is linked to a communication network. In other words, in the database a list is stored where one or more paging channels are linked or connected to a respective communication network.

In a preferred embodiment, only one paging channel is linked to one communication network.

This list is required because the terminal has to know or should select which paging channel should be used for scanning information or data at a location where the terminal is positioned. The position can, as said, be derived from the network name broadcasted for instance as part of the BCCH data or by GPS and/or a kind of map matching.

As already mentioned above, the terminal determines in which communication network it is located. Based on this determination, the terminal selects from the database the corresponding paging channel of the communication network in which it is located. A paging channel is different or changes for different communication networks. More than one paging channel can exist in a communication network.

The method can be used for scanning paging channels. The present invention is not limited to this term. The method could also be called method for terminal addressing or terminal activation or remote activation or remote paging. In addition the prefix international can be used, because the method as well as the terminal can be used for communication networks of different countries, for example.

Alternatively or in addition, the present invention is not limited to the term paging channel. A paging channel can also be called an initialisation channel, a terminal addressing channel or remote activation channel or remote paging channel or the like. In addition the prefix international can be used, because the method as well as the terminal can be used for communication networks of different countries, for example.

According to another preferred embodiment, the terminal receives information via the selected paging channel. In addition the terminal evaluates the received information. What kind of information can be received by the terminal and how the evaluation can be performed is already described with regard to the first aspect of the present invention. Full reference is made to the corresponding passage of the description. The information which can be every type of information, like data, signals or messages, can be received because the terminal scans the paging channel(s) for the communication network in which the terminal is located. The received information is then evaluated.

According to another preferred embodiment the received information is evaluated in relation to information stored on/in the terminal. How the evaluation can be performed is already described with regard to the first aspect of the present invention. Full reference is made to the corresponding passage of the description. The information received by the terminal can comprise for example an identity code. The terminal can also comprise an identity code. In such case, the terminal can compare the received identity code with the terminals' identity code. The present invention is not limited to specific types of information. The information which is received by the terminal evaluated in relation to information stored in the terminal can also be action codes or the like.

According to another preferred embodiment the terminal is activated for establishing a communication with the communication network in which the terminal is located, in case that the received information matches the stored information.

As already mentioned above, the received information is evaluated by the terminal in relation to information stored in the terminal. Using the example as mentioned above, the received information can for example be an identity code. If the terminal evaluates the received information in relation to the stored information and the received information matches and/or corresponds to and/or is equal and/or equivalent to the stored information, the terminal is activated for establishing a communication with the communication network in which the terminal is located. The present invention is not limited to evaluation of only one received information. The evaluation of information can for example firstly be done for an identity code followed by the evaluation of an action code for example. For activating the terminal to establish a communication it is important that all the evaluation conditions are fulfilled. The conditions can for example be that the received identity code corresponds to the stored identity code and/or the received action code corresponds to the stored action code. When a list of action codes is stored in the terminal, the received action code should correspond to on action code of the list.

For example, one identity code can be stored in the terminal. Alternatively or in addition, one or more and/or several action codes can be stored in the terminal. If more or several action codes are stored in the terminal, these action codes can be clustered in a kind of action code list, for example. How this can be performed is already explained with regard to the first aspect of the present invention. Full reference is made to the corresponding description.

It is also possible that the arrangement is updated manually.

Preferably the method of scanning paging channels of communication networks by use of a communication terminal comprises features which can be used for the described communication terminal according to the first aspect of the present invention as well as features for performing the described method according to the third aspect of the present invention. Therefore, full reference is made to the disclosure relating to the communication terminal and method according to the present invention.

According to a third aspect of the present invention, a method of activating a communication terminal for establishing a communication with a communication network in which the terminal is located, is provided. The terminal is registered in a home communication network. The home communication network sends information to other communication networks and through other communication networks via paging channels linked to the home communication network. The terminal scans those paging channels. The terminal establishes a communication to the communication network in which it is located.

It is possible, that the home communication network sends information to other communication networks via a dedicated channel to address the visited networks paging channels so that it appears that the paging channel in the visited communication network is linked to the home communication network.

The strategy and tactics of paging a device presumably first in the home network and in a second step in visited networks has been already described above. Full reference is made to this description.

In particular, the method can be used for activating a communication terminal according to the first aspect of the present invention.

In particular, the scanning of paging channels by the terminal can be performed by use of a method according to the second aspect of the present invention.

As mentioned already above, the method for activation of a communication terminal can be performed by use of the terminal according to the first aspect of the present invention as well as by use of the method of scanning paging channels, full reference is made to these descriptions and the disclosure of the corresponding passages or sections.

The method can be used for activating a communication terminal. An activation is generally spoken an action or operation by which something is started. The activation in correspondence to the present invention is understood in a way, that a terminal, which is for example not present to a communication network and/or the provider of a communication network and/or a third party, actively registers to a communication network.

Additional features and details of the present invention according to all three aspects become apparent from the following disclosure as well. It can be possible that a terminal is initially registered once in a communication network. This can be done for general setup and parameterisation. This means, that the communication network and/or the provider of a communication network and/or a third party like a Service Provider, for example a vehicle manufacturer knows that the terminal is known to the communication network and its credentials are stored on the HLR. During the initial registration process, for example only the identity of terminal may be stored in the communication network or by the provider of the communication network and/or by a third party.

After the registration process, the terminal is detached from the network and disappears for the communication network and/or the provider of the communication network and/or a third party. This means, that the communication network and/or the provider of the communication network and/or a third party do not know at/in which location or position in the communication network, or in which countries communication network the terminal is located. The communication network can scan the paging channels to determine the terminals' position. This may take years in what the devices or vehicles position is unknown.

The activation process described according to the present invention is understood in a way, that the communication terminal establishes a communication to a communication network. By doing so, the terminal's identity as well as its location or position are then known and/or visible to the communication network and/or the provider of the communication network and/or a third party. This is the intention as this allows for instance to recover a stolen vehicle what's eCall device had been remotely advised to attach to the network.

As mentioned above, the terminal is generally or fundamentally registered. The terminal is registered in a home communication network. A home communication network is the communication network, where the terminal is registered for example to the HLR. This means, the home communication network is the network, where for example the required information for identifying the terminal is stored. The home communication network is in particular the network of the provider of the terminal. It is also possible that the home communication network is the communication network in which the terminal firstly was used and/or registered or the like.

For example, the home communication network of a terminal can be a German communication network provided by a Germany based provider.

The home communication network sends information to other communication networks via dedicates channels that are linked to paging channels of a visited for example, not knowing if the vehicle is actually present in that particular country. As already mention above, the home communication network can for example be a German communication network. In such case, the home communication network can send information, which is already described above, to other communication networks, either within Germany or outside Germany. These other communication networks can for example be communication networks in other countries. A provider can provide for example a German communication network. The same provider can also provide communication networks, which are preferably of the same type, in other countries, for example in France or Great Britain. When a terminal is generally located in Germany, the home communication network is the German communication network. According to the present example, the communication network can send information to a French communication network and to a communication network in Great Britain, in particular to communication networks of the same type and/or of the same provider.

The information is sent via paging channels for example over the air to the device. Between communication providers the information may travel via the internet or via dedicated channels like the operators global roaming exchange (GRX). As mentioned above, a communication network comprises at least one paging channel. Such paging channel can be a special broadcast channel or any dedicated channel on a mobile network.

The information is sent via paging channels linked to said home communication network. As mentioned above, a provider of a communication network in Germany can also provide a communication network in other countries. In such case the paging channels are linked to said home communication network, because a connection between paging channels, home communication network and the other communication network exists.

It is also possible that the connection between the paging channels and the home communication network exists because the paging channel and the home communication network and the other communication networks use the same technique. The paging channel and the home communication network and the other communication networks can be components or parts of a telecommunications network for example.

The terminal scans the paging channels. In particular, the terminal scans the paging channel related to or of the communication network in which the terminal is located. This means, that the terminal firstly determines the communication network it is located in. Afterwards the terminal selects one or the paging channel(s) from a database for the communication network in which the terminal is located. The terminal can than scan the selected paging channel(s) for information. When the terminal receives information sent via the paging channel this information can be evaluated. After the evaluation, the terminal can establish a communication to the communication network in which the terminal is located.

An important aspect of the present invention is that the terminal scans the paging channel, which can also be more than one paging channel, of the communication network in which it is located. The home communication network sends information via paging channels to a variety communication networks. So, the information sent by the home communication network is broadcasted and/or widely spread out, in particular by using a plurality of paging channels. This is required because the home communication network does not know in which communication network the terminal is located.

Using the above mentioned example, the terminal can be located in France but the home communication network can be in Germany. In such case the home communication network can send information via paging channels from the German communication network to the French communication network and the British communication network. When the terminal is located in a French communication network, the terminal can receive the information via the paging channel from the French communication network.

When the information is sent from the home communication network via paging channels it is also possible, that the information is also sent into the home communication network.

In a preferred embodiment, the terminal establishes a communication to the home communication network or any other predefined network or destination via the communication network, in which it is located. This means, that the communication from the terminal which is not located in the home communication is forwarded via the communication network in which the terminal is located to the home communication network of the terminal.

When the terminal establishes a communication to the home communication network via the communication network in which the terminal is located, it is possible for the home communication network and/or the provider of the communication network and/or a third party who does not know the location of the terminal to contact the terminal. This information is received by the terminal and evaluated. After the evaluation, the terminal establishes a communication to the communication network in which the terminal is located, this communication can for example be forwarded to the home communication network.

Referring to the above mentioned example, the terminal can be located in France and the home communication network is the German communication network. The German communication network sends information via the paging channel, which are transmitted also to the French communication network. The terminal receives the information by scanning the corresponding paging channel for the French communication network. After the evaluation of the received information, the terminal establishes a communication to the French communication network. This communication can than be forwarded to the home communication network of the terminal.

The communication to the home communication network can be realised by using a paging channel or by any other communication channel.

When the communication to the home communication network is established a voice and/or data transfer between the home communication network and the communication terminal is possible.

It is also possible, that the terminal establishes a communication to any other predefined network or destination.

Preferably the method of activating a communication terminal comprises features which can be used for the described communication terminal according to the first aspect of the present invention as well as features for performing the described method according to the second aspect of the present invention. Therefore, full reference is made to the disclosure relating to the communication terminal and method according to the present invention.

The idea of the present invention can also be described as follows. The central idea is to establish the technical setup for a pan-European or even World Wide initialisation or paging mechanism that prohibits a device being continuously attached to the network and so discloses and updates the location or trying to re-establish network connection in case of roaming and restrict the back end of continuously paging the device while being able to be initialised or paged from the outside by, at the same time, meeting and/or conforming to the Article 29 Working Party requirements.

Basically, these requirements require certain adjustments both to the back end systems, like for example the Mobile Switching Centre (MSC) and/or the Home Location Register (HLR) and the front end systems, like for example the Subscriber Identity Module (SIM) and/or eCall device.

On the back end-side, the Home Location Register (HLR) and/or the Home Subscriber Service (HSS) has/have to be able to bar or suppress general paging under all circumstances for these eCall SIMs. The back end system shall only issue a paging request if a tracing request has been issued in case of for example a vehicle theft. In such case, the request shall be checked on its legality. Organisational as well as technical provisions have to be set up to accept such a solution and to prevent internal and/or external misuse.

Such an updated paging regime, that prevents paging of eCall devices under normal circumstances and keep the devices dormant all times is not available today and has its difficulties to fit into normal network operation. Especially to keep the association between the network and the terminal active for such a very long period, like months or even years, seems difficult.

Additionally, it could violate some of the Art 29 principles, if the eCall device can be activated and traced from the outside. Unlike the two Article-29 requirements, firstly, the ability to switch off eCall completely and, secondly, to guarantee a non-traceable system under all circumstances, the user has to have full trust in the system but has only limited or even no means to check, decide or react. That may violate the intention of the Article-29 principles as the want to hand over the power to decide to the user.

On the front end-side, the eCall device has to be capable to listen to and to identify a paging request from the back end while itself being passive for a very long time—even month or years. A "pure eCall device", fulfilling the Article-29-Working-Party requirements, will presumably not meet this requirement, because it shall not be traceable and will not be traceable from a technical point of view. It simply does not react to any requests from the outside.

Regarding the actual 'wake-up' process of the passive behaving device—as described above—one solutions is possible.

The solution, which is described in relation to a communication terminal, a method of scanning paging channels and a method for activation of a communication terminal, intends to store a list or database of access credentials of paging channels and supplementary information on the terminal, an eCall device for example, when it is first registered and tested during the vehicles' assembly, during the sales process or any other process. This list or data base may be updated when the vehicle is in at the workshop for inspection, the user runs a test call by deliberately execution a command from the device's menu or other situations that do not reveal any moving patterns and are safe for the user. But in general the system setup shall be, in particular extremely, long term stable to allow a continuous operation without the need to attach the terminal. The terminal itself stays in a kind of idle mode for all the time and does not react on general requests.

If the terminal crosses borders, for example network borders, in Europe, it can detect this by evaluating to the Broadcast Channels (BCCHs), by using GPS or other means and looks up in the list or database, what particular channels are used at that location and/or network. The device will not try to connect to one of the available visited MNOs. The communication device keeps dormant all the time until woken up by a well defined external event.

The back end has to keep a record, presumably combined with information on the HLR/HSS that indicates that a certain type or range of Services are eCall- and tracking-Value Added Services (VAS)-SIMs and shall not be paged on a regular base. This should be realised unless the contract is extended to allow a continuously or sporadic use of other services that need a registration with the network. This may be Internet, voice calls or other services.

It is clear that such a European or World Wide Machine-to-Machine (M2M) paging mechanism may first only work within a network family, but not necessarily with rivalling networks. And it is necessary that all participating networks have to comply to and support the system and implement the necessary changes. If the networks in a country do not support the mechanism, the location is not revealed, because the decision to react on a paging request or to register with a network is handled by the device only and not the network so that an Article-29-Working-Party compliant operation of an eCall device can be guaranteed anyway.

For a realisation such a European or World Wide M2M paging mechanism it can be possible to use the Forward Access Channel (FACH) or other applicable channels.

Misuse can be controlled as only the MNOs does have access to these channels and paging mechanisms. Precautions have to be implemented that a paging request from the outside, for example a call to the eCall devices Mobile Station Integrated Services Digital Network Number (MSISDN), does not trigger a paging request or other reactions. The Home Mobile Network Operator (MNO) can filter these requests and even the device may additionally filter on such events.

For a better understanding of the present invention, a preferred embodiment of the present invention will now be described by way of example with reference to the description and the accompanying drawing, in which FIG. 1 is an illustration of the method of activating a communication terminal, showing several components like the communication terminal.

FIG. 1 shows an illustration of the method of activating a communication terminal 10. In FIG. 1 several components like the communication terminal 10 are also shown.

For a better understanding of FIG. 1, FIG. 1 is divided in several parts, which can also be called clustered. The functionality of the components is described after all components are shortly introduced.

First of all, a home communication network 2 is shown on the left hand side of FIG. 1. The home communication network comprises a Mobile Network Operator (MNO) 12 or a third party. The MNO 12 uses for example a base station 13 for sending information 24.

On the MNO 12 or third party side, a database 20 is located where data are stored. These database 20 comprise for example a list of paging channels 22, communication network related data 23 and an action code list 21.

The MNO 12 or the third party can send information 24 which comprises an identity code 14 and an action code 21.

The MNO 12 or third party has access to the database 20 via the connection 201. The availability of the information 24 can be enabled by the connection 200 for example.

On the right hand side, a communication network 1 is shown. In the communication network 1, a communication terminal 10, which will be called terminal 10 in the following, is located. The terminal 10 can be for example an eCall terminal 10a. This terminal 10, 10a comprises a communication unit 11 which comprises a Subscriber Identity Module (SIM) 11a. The terminal 10, 10a further comprises a scanning unit 15, an evaluation unit 16, an activation unit 17 and a determination unit 50. The communication network 1 can be a visited communication network 1. The communication network 1 can also be the home communication network 2. In the following, the communication network 1 is called visited communication network 1.

The terminal 10, 10a has access to a database 20 via the connection 202. The database 20 is comparable with the database 20 on the left side. The database 20 comprises an identity code 14, an action code 21 which can be arranged as list. The database 20 further comprises a paging channel 22 list and communication network related data 23. In the embodiment, the database 20 is part of the terminal 10, 10a as well or the terminal has access to it.

A connection between the two communication networks, the home communication network 2 on the left hand side and the visited communication network 1 on the right hand side is possible through or via the paging channel 22. The paging channel 22 can comprise of a wired and a wireless section. Alternatively or in addition, a communication 101 can be established between the communication networks 1, 2.

In addition, two smaller communication networks 1 are presented in FIG. 1 which are placed above the home communication network 2.

After all parts or components shown in FIG. 1 are presented, the present invention will be described by making reference to FIG. 1.

An eCall terminal 10a is usually installed in a vehicle (not shown) and enables, as mentioned already above, eCall technology in case of an emergency, like an accident with the vehicle.

The terminal 10, 10a has to be enabled before use. When for example a vehicle is sold by the manufacturer of the vehicle and the new owner of the vehicle wants to use eCall and the stolen vehicle recovery as described in this invention, the owner or the manufacturer of the vehicle can register the terminal 10, like an eCall terminal 10a in a communication network 1, 2. This is usually done in a home communication network 2.

When the vehicle is sold in Germany and the eCall terminal 10a is registered in Germany, the home communication network 2 is a German communication network 2. The registration of the terminal 10, 10a is usually done in a communication network 1, 2 powered by a provider, which can also be called Mobile Network Operator (MNO) 12.

The MNO 12 provides the communication network 1, 2. Referring to FIG. 1, the registration of the eCall terminal 10a is performed in the home communication network 2, which is located in Germany. The home communication network 2 can be called the German communication network 2.

In the following reference is made to a terminal 10, which is arranged as an eCall terminal 10a.

An eCall is usually performed in a communication network 1, 2. That is why the communication network 1, 2 is preferably a telecommunication network 1, 2.

Once the eCall terminal 10a has been registered in the home communication network 2, and the eCall terminal 10a goes dormant afterwards as standardised, the eCall terminal 10a is not visible or traceable for the communication network 1, 2 any longer. This is a requirement of the European Commission which standardised and mandates the eCall technology. The requirements for eCall are that an eCall terminal 10a and so the vehicle in which the eCall terminal 10a is installed is not traceable and the owner or driver of the vehicle, must be able to switch off the eCall terminal 10a completely.

But when an eCall terminal 10a is not visible for the communication network 1, 2, it is impossible to send information or data or messages or the like to the eCall terminal 10a. The possibility of contacting the eCall terminal 10a can be a value added service when the vehicle is stolen, for example.

The present invention provides a solution to solve the problem of contacting an eCall terminal 10a, which for themselves, and which location is unknown for the communication network 1, 2. This is the reason because the eCall terminal 10a does not register in the communication network 1, 2 continuously like mobile phones for example do. The eCall terminal 10a is once initially registered in the communication network 2. Procedures which are standard procedures for conventional mobile phones like a handover when leaving one cell followed by entering another cell of a communication network for example are not performed by the eCall terminal 10a.

The eCall terminal 10a is initially registered once in the home communication network 2. After the registration the eCall terminal 10a does not perform any procedures like handover, regular paging or location area updates. That is why the communication network 1, 2 does not know the location of the eCall terminal 10a. When the communication network 1, 2 does not know the location of the eCall terminal 10a, it is impossible to send information to the eCall terminal 10a.

The eCall terminal 10a can for example cross the border of the country. By doing so, the eCall terminal 10a leaves its home communication network 2 and enters another communication network 1. The communication network 1, 2 does not know anything about the border being crossed.

When for example the home communication network 2 wants to contact the eCall terminal 10a, the home communication network 2 transmits information 24 via a base station 13. This information 24 is transmitted via paging channels 22. These paging channels 22 can be for example a regular or a special broadcast channels. The information 24 is transmitted via the paging channels 22 in the home communication network 2 as well as into other communication networks 1. This is required because the home communication network 2 does not know the location of the eCall terminal 10a. In FIG. 1, the eCall terminal 10a is not located in the home communication network 2. Instead the eCall terminal 10a is located in another communication network 1.

The home communication network 2 transmits information 24 via paging channels 22 into other communication networks 1. The information 24 which is transmitted comprises an identity code 14 and/or an action code 21. The identity code 14 is known by the home communication network 2 because the eCall terminal 10a was once registered in the home communication network 2.

The action code 21 can be selected from an action code 21 list which is stored in a database 20 on the home communication network 2 side.

The database 20 also comprises communication network related data 23 as well as paging channels 22. The communication network related data 23 are data concerning the communication networks 1, 2. The paging channels 22 are channels by which information 24 can be transmitted to/in the communication networks 1, 2.

The communication network related data 23 and the paging channels 22 are linked in a way that the corresponding paging channel(s) 22 is/are listed. This is also done for Germany and Great Britain as shown in FIG. 1.

The information 24 comprising an identity code 14 as well as an action code 21 is transmitted from the home communication network 2 to the communication networks 1. In FIG. 1 only three communication networks 1, which are visited communication networks 1 are presented.

When the eCall terminal 10a is not located in the home communication network 2, but in a visited communication network 1 the eCall terminal 10a determines its position by use of the determination unit 50. In the example of FIG. 1, the determination unit 50 of the eCall terminal 10a determines that the eCall terminal 10a is located in France. The determination of the position can be performed in several ways.

The determination unit 50 can for example tap open broadcast channels of the visited communication network 1. This is possible because general information about the visited communication network 1 is transmitted via such open broadcast channels.

Alternatively or in addition, the determination unit 50 can measure the signal strength of a communication network 1 in which the terminal is located. This can be necessary for example, if the eCall terminal 10a is located near a country border. In such a situation the eCall terminal 10a can receive information 24 from two different communication networks 1, 2. By measuring the signal strength of the communication network 1, 2, the eCall terminal 10a can detect in which communication network 1, 2 it is located. Another possibility for detection in which communication network 1, 2 the eCall terminal 10a is located is the use of a position detection unit 50 like the global position system (GPS) or Galileo or the like.

When the eCall terminal 10a has detected its position, the eCall terminal 10a needs to know which paging channel 22 has to be scanned.

Therefore the eCall terminal 10a comprises a database 20. In this database 20 communication network related data 23 are linked with paging channels 22. In FIG. 1, the eCall terminal 10a detects that it is located in a French communication network 1.

After the position detection the eCall terminal 10a searches in the database 20 for the corresponding paging channel 22 for France. For the French communication network 1 the corresponding paging channel 22 is the channel "zzz".

The list of the communication related data 23 and the paging channels 22 can be implemented the eCall terminal 10a while registering in the home communication network 2 for example. The present invention is not limited to this solution. It is also possible, that the eCall terminal 10a is updated at defined dates, for example.

The communication network related data 23 stored in the database 20 are data of communication networks 1, 2 of the same communication network type.

After the eCall terminal 10a has selected the paging channel 22, the eCall terminal 10a can scan the paging channel 22 for information.

As already mentioned above, the home communication network 2 sends information 24 to several communication networks 1. One of these communication networks 1 is the French communication network 1. So, the eCall terminal 10a receives the information 24 transmitted from the home communication network 2 to the French communication network 1 by use of the scanning unit 15.

In the following, the received information 24 is evaluated in relation to information 24 stored in the eCall terminal 10a. The received information 24 comprises an identity code 14 and/or an action code 21. First of all, the identity code 14 is evaluated. This is required because every eCall terminal 10a can receive the transmitted information 24, since the information 24 is transmitted in a variety of communication networks 1, like the French or British communication network 1, and each eCall terminal 10a located in one of these communication networks 1 can receive the information 24. But the transmitted information 24 may only be addressed to one specific eCall terminal 10a. The information 24 transmitted in FIG. 1 is addressed to eCall terminal 10a with the identity 0172-12345678. In this case the identity code 14 is a telephone number. Other forms of identity codes 14 are also possible and may comprise the IMSI/TMSI (International Mobile Subscriber Identity/Temporary Mobile Subscriber Identity) used to address eCall terminals 10a within the communication network 1,2.

After the identity code 14 is compared with the identity code 14 of the eCall terminal 10a and in case that the received identity code 14 matches the identity code 14 stored in the database 20 of the eCall terminal 10a, the received action code 21 is evaluated.

The received information 24 comprises the action code 21 "123ABC4" for example. By evaluation of this action code 21 using the evaluation unit 16, the eCall terminal 10a knows that the eCall terminal should contact "XY", which is the MNO 12 of the home communication network 2.

After the evaluation which can result in that the received information 24 matches the stored information 24, the eCall terminal 10a establishes a communication with the communication network 1.

If no action code 21 is received or the action code 21 cannot be read, the eCall terminal 10a may either wait for a second broadcast. As usually the paging has to be repeated several times to definitely address an eCall terminal 10a that may for some, maybe short, time without coverage to decode the action code 21 or perform a predefined action.

This communication can comprise or be a registration or a login in the communication network 1 where the eCall terminal 10a is located. This registration or login is similar to registration of conventional mobile phones for example.

After the activation of the eCall terminal 10a using the activation unit 17, a communication 101 to the home communication network 2 can be established by the eCall terminal 10a.

This communication 101 can be realised by using a paging channel 22 or by using any other communication channel.

When the communication 101 to the home communication network 2 is established a voice and/or data transfer between the home communication network 2 and the eCall terminal 10a is possible.

LIST OF REFERENCE NUMERALS

1 Visited communication network
2 Home communication network
10 Communication terminal
10a eCall terminal
11 Communication unit
11a Subscriber Identity Module
12 Mobile Network Operator (Third party)
13 Base station
14 Identity code
15 Scanning unit
16 Evaluation unit
17 Activation unit
20 Database
21 Action code (list)
22 Paging channel (Broadcast channel)
23 Communication network related data
24 Information
50 Determination unit
101 Communication
200 Connection
201 Connection
202 Connection

The invention claimed is:

1. An eCall terminal, said eCall terminal not performing any registration with a communications network after said eCall terminal was initially registered in a home communications network, apart from an emergency case, said eCall terminal comprising a communication unit and an interface for communication of said eCall terminal with communication networks, said eCall terminal comprising a determination unit for determining in which communication network the eCall terminal is located, characterised in that the eCall terminal comprises a database in which communication network related data for a number of different communication networks are stored, in which said communication network related data are linked to paging channels of the respective communications networks, that the eCall terminal selects a paging channel related to the communication network, in which the eCall terminal is located, from said database, that the eCall terminal comprises a scanning unit for scanning the selected paging channel for information and that the eCall terminal further comprises an evaluation unit for evaluating the information received via the paging channel.

2. The eCall terminal according to claim 1, characterised in that the determination unit is adapted for performing tapping broadcast channels and/or measuring of the signal strength of a communication network and/or that the determination unit comprises a position detection unit.

3. The eCall terminal according to claim 1, characterised in that the communication network related data stored in the database are data related to communication networks of the same communication network type.

4. The eCall terminal according to claim 1, characterised in that the evaluation unit is adapted to evaluate the received information in relation to information stored in the eCall terminal.

5. The eCall terminal according to claim 1, characterised in that the information received by the eCall terminal comprises an identity code and/or an action code.

6. The eCall terminal according to claim 4, characterised in that the information stored in the eCall terminal comprises an identity code and/or an action code.

7. The eCall terminal according to claim 1, characterised in that the eCall terminal comprises an activation unit for activation of the eCall terminal for establishing a communication with the communication network in which the eCall terminal is located.

8. The eCall terminal according to claim 7, characterised in that the activation unit is adapted for performing an activation of the eCall terminal in the communication network based on the results of the evaluation.

9. A method of scanning paging channels of communication networks by use of an eCall terminal according to claim 1, said eCall terminal not performing any registration with a communications network after said eCall terminal was initially registered in a home communications network, apart from an emergency case, characterised by the following steps:
- the eCall terminal determines in which communication network the eCall terminal is located,
- the eCall terminal selects a paging channel related to said communication network in which the eCall terminal is located from a database, said database comprising communication network related data for a number of different communication networks, said communication network related data being linked to paging channels of the respective communication networks, and
- the eCall terminal scans the selected paging channel for information.

10. The method according to claim 9, characterised in that the eCall terminal receives information via the selected paging channel, and that the eCall terminal evaluates the received information.

11. The method according to claim 9, characterised in that the received information is evaluated in relation to information stored in the eCall terminal.

12. The method according to claim 9, characterised in that in case that the received information matches the stored information, the eCall terminal is activated for establishing a communication with the communication network in which the eCall terminal is located.

13. A method of activating an eCall terminal, said eCall terminal not performing any registration with a communications network after said eCall terminal was initially registered in a home communications network, apart from an emergency case, said eCall terminal comprising a communication unit and an interface for communication of said eCall terminal with communication networks, said eCall terminal comprising a determination unit for determining in which communication network the eCall terminal is located, said eCall terminal comprising a database in which communication network related data for a number of different communication networks are stored, in which said communication network related data are linked to paging channels of the respective communications networks, said eCall terminal selecting a paging channel related to the communication network, in which the eCall terminal is located, from said database, said eCall terminal comprising a scanning unit for scanning the selected paging channel for information and said eCall terminal further comprising an evaluation unit for evaluating the information received via the paging channel, in which the eCall terminal is registered in a home communication network, for establishing a communication with a communication network in which the eCall terminal is located, characterised in that the home communication network sends information to other communication networks and through other communication networks via paging channels linked to said home communication network, that the eCall terminal scans those paging channels by use of a method according to claim 9, and that the eCall terminal establishes a communication to the communication network in which it is located.

14. The method according to claim 13, characterised in that the eCall terminal establishes a communication to the home communication network via the communication network in which it is located.

* * * * *